United States Patent [19]

Smith et al.

[11] Patent Number: 5,782,607
[45] Date of Patent: Jul. 21, 1998

[54] REPLACEABLE CERAMIC BLADE INSERT

[75] Inventors: Blair A. Smith, South Windsor, Conn.; James Cook, Agawam, Mass.; Joseph L. Mattavi, Granby; Harry E. Eaton, Woodstock, both of Conn.

[73] Assignee: United Technologies Corporation, Hartford, Conn.

[21] Appl. No.: 763,915

[22] Filed: Dec. 11, 1996

[51] Int. Cl.⁶ .................................................. B64C 11/26
[52] U.S. Cl. ........................................................ 416/224
[58] Field of Search ................. 416/224, 241 R, 416/241 B, 229 R, 229 A; 29/889.1, 889.7, 889.71, 889.72

[56] References Cited

U.S. PATENT DOCUMENTS

| | | |
|---|---|---|
| 3,215,511 | 11/1965 | Chisholm et al. . |
| 4,010,530 | 3/1977 | Delgrosso et al. . |
| 4,318,672 | 3/1982 | Hansen . |
| 4,728,262 | 3/1988 | Marshall . |
| 4,738,594 | 4/1988 | Sato et al. ............................ 416/224 |
| 4,815,940 | 3/1989 | LeShane et al. ............... 4169/241 A |
| 5,165,859 | 11/1992 | Monroe . |
| 5,174,024 | 12/1992 | Sterrett . |
| 5,209,645 | 5/1993 | Kojima et al. . |
| 5,210,946 | 5/1993 | Monroe . |
| 5,306,120 | 4/1994 | Hammer et al. . |
| 5,358,379 | 10/1994 | Pepperman et al. . |
| 5,542,820 | 8/1996 | Eaton et al. . |
| 5,595,831 | 1/1997 | Clark ................................... 416/241 R |

FOREIGN PATENT DOCUMENTS

| | | | |
|---|---|---|---|
| 59502 | 1/1984 | Japan . | |
| 233693 | 12/1968 | U.S.S.R. | ............................ 416/224 |

*Primary Examiner*—Christopher Verdier

[57] ABSTRACT

An apparatus for protecting the leading edge of an aerodynamic blade such as a propeller blade and more particularly to an apparatus for improving the maintainability of the leading edge protective sheath. In the preferred embodiment, a protective sheath made of a ductile material of sufficient hardness material such as titanium, stainless steel, nickel or a nickel alloy is attached to the leading edge of a propeller blade. The protective sheath has an interior surface that complements the leading edge of the underlying propeller blade material, while the exterior surface of the sheath is optimized to achieve an efficient dynamic profile for the propeller blade. The protective sheath is further modified so that a harder material such as ceramic can be secured to the surface of the protective sheath along its leading edge at the tip end of the propeller blade wherein erosion rates are highest.

26 Claims, 2 Drawing Sheets

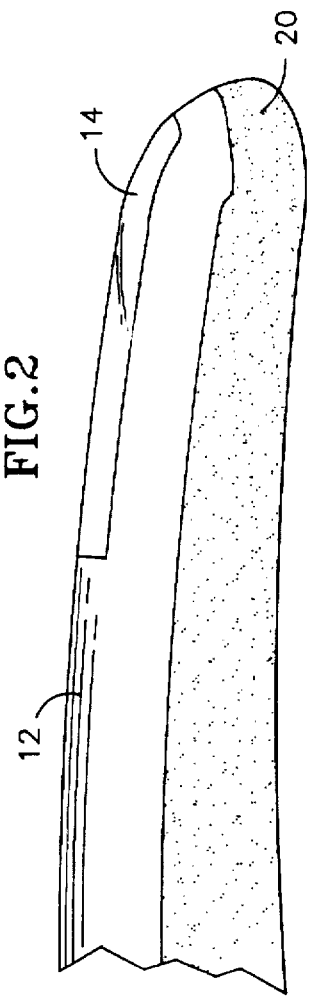
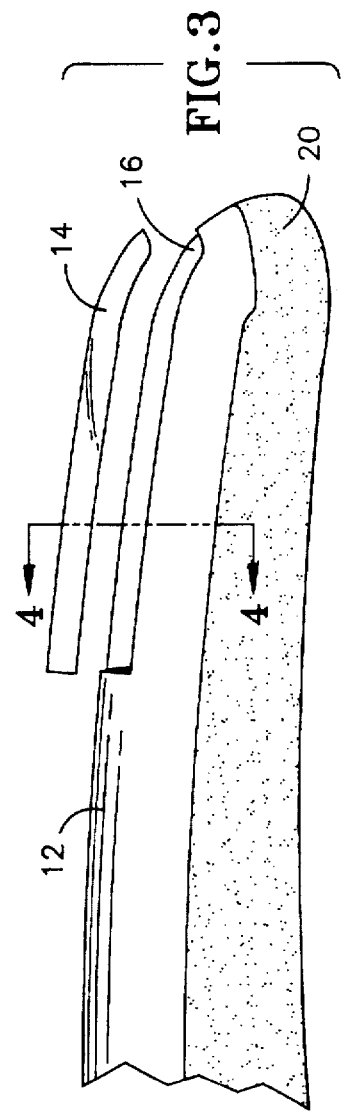
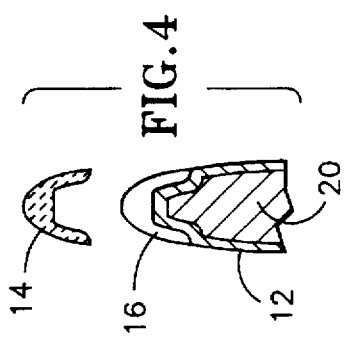
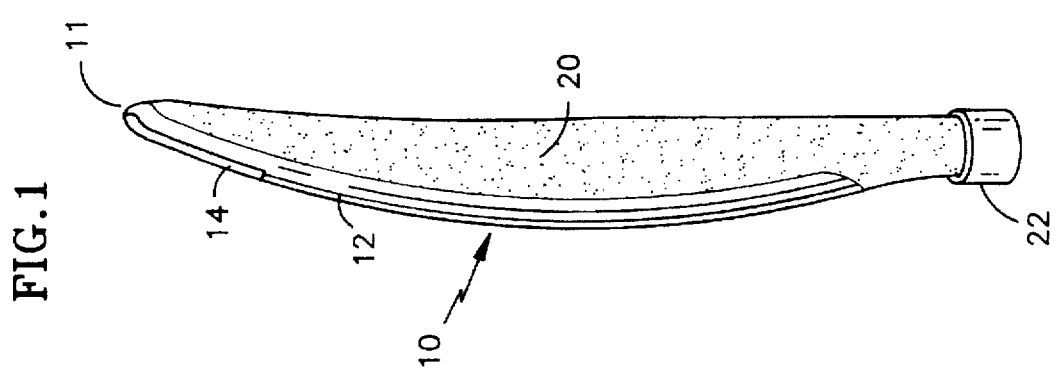

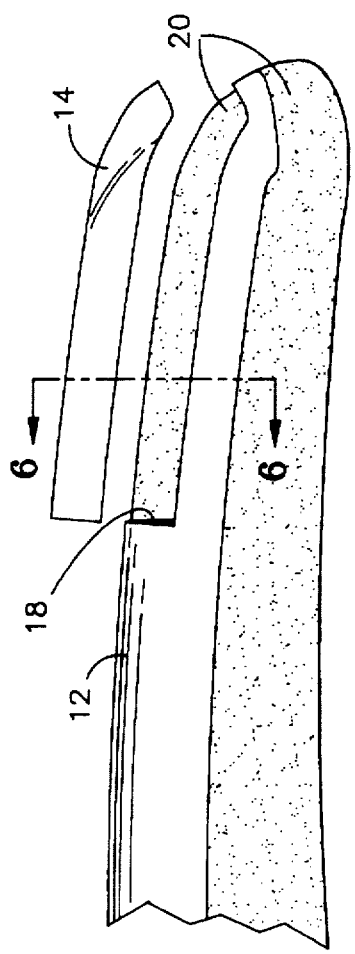
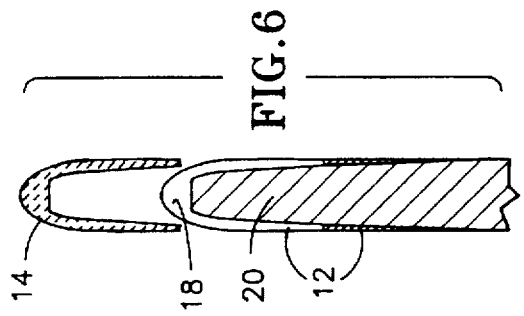
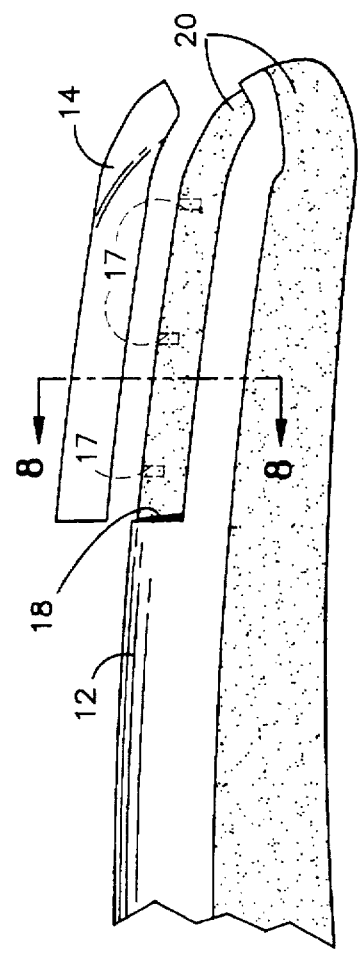
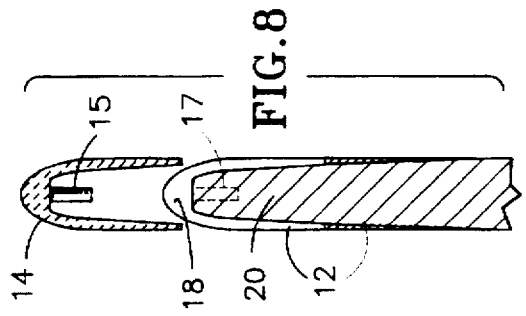

REPLACEABLE CERAMIC BLADE INSERT

TECHNICAL FIELD

This invention relates to an apparatus for protecting the leading edge of an aerodynamic blade such as a propeller blade and more particularly to an apparatus for improving the maintainability of the leading edge protective sheath.

A propeller system has a direction of rotation for producing a propulsive force. The rotating propeller blades of the propeller system have a leading edge that is subjected to airflow. This leading edge of the propeller blade requires protection from erosion, due to impact of rain, sand and other foreign objects. It is well known in the industry to dispose a metal sheath, such as nickel, upon the leading edge of a propeller blade to provide such protection. This protective sheath serves as a sacrificial material protecting the underlying propeller blade. The nickel sheath is especially well adapted because of the need for the sheath to withstand the normal bending moments experienced by the propeller blade during operation.

The sheath acting as a sacrificial material must be replaced periodically as it wears, requiring the aircraft to be taken out of service to remove the effected propeller. The sheath must then be removed, and the underlying blade material repaired as required. A new sheath is then bonded to the underlying propeller blade material. The propeller blades of a propeller system have an inboard end that is attached to a propeller hub for rotation therewith and an outboard end furthest from the hub. It has been observed that the protective sheath erodes more quickly at the outboard end of the propeller blade due to higher rotational velocities thereof, wherein the relative impact velocities of foreign objects are significantly higher.

Ceramics have also been employed for leading edge protection of propeller blades used in air cushion vehicles as described in U.S. Pat. No. 4,728,262. This patent employs ceramics along the entire leading edge of the propeller blade. The ceramics are segmented to allow for twisting and bending of the blade. However, this limits blade performance because the blade is constrained to bending at the interface of the adjacent ceramic segments leading to higher stress in these regions. The use of segmented ceramics also reduces aerodynamic efficiency of the blade by introducing discontinuities in the leading edge surface.

It is also known to employ combinations of metals as to protect the leading edge of helicopter rotors. In such application a sheath of nickel over titanium is used along an inboard section of the rotor blade where strain due to bending of the blade is highest. Titanium provides good strain relief characteristics while the nickel enhances erosion protection. A single layer of nickel is used at the outboard end where bending is less pronounced and wear due to erosion is highest. However, this apparatus suffers from the problem as in the other prior art in that replacement of the sheath material is expensive and time consuming.

Therefore, there exists a need to provide enhanced erosion protection for the leading edge of propeller blades and to provide leading edge protection for propeller blades with enhanced maintenance characteristics while maintaining the compliance of the propeller blade.

DISCLOSURE OF INVENTION

It is an object of the present invention to provide a replaceable ceramic insert as part of the protective sheath for the leading edge of a propeller blade to provide enhanced erosion protection. It is a further object of this invention to provide a replaceable ceramic insert that facilitates maintenance and repair of the protective sheath and propeller blade while maintaining the flexibility, compliance and aerodynamic efficiency of the propeller blade.

In accordance with the present invention a unique apparatus is disclosed which increases the life and reduces repair costs of a propeller blade.

In the preferred embodiment, a protective sheath made of a material such as titanium, stainless steel, nickel or a nickel alloy is attached to the leading edge of a propeller blade. The protective sheath has an interior surface that complements the leading edge of the underlying propeller blade material, while the exterior surface of the sheath is optimized to achieve an efficient aerodynamic profile for the propeller blade. The protective sheath is further modified so that a ceramic insert can be incorporated along the leading edge at the outboard end of the propeller blade wherein erosion rates are highest. The exterior surface of the ceramic insert is shaped to form a continuation of the efficient aerodynamic profile for the propeller blade while the interior surface is shaped to complement the exterior surface of the protective sheath that is modified to accept the ceramic insert.

The above and other objects and advantages of this invention will become more readily apparent when the following description is read in conjunction with the accompanying drawings.

BRIEF DESCRIPTION OF THE DRAWINGS

FIG. 1 is a perspective view of a propeller blade employing a protective sheath according to the present invention;

FIG. 2 is a side view of a protective sheath with a ceramic insert attached.

FIG. 3 is an exploded view of the finished sheath and ceramic insert;

FIG. 4 is a view of FIG. 3 along line 4—4;

FIG. 5 is an exploded view of the protective sheath and ceramic insert where a ceramic insert is mounted to the blade material;

FIG. 6 is a view of FIG. 5 along line 6—6.

FIG. 7 is an exploded view of the protective sheath and ceramic insert having a plurality of protrusions adapted to be inserted in holes located in the underlying blade material.

FIG. 8 is a view of FIG. 7 along line 8—8.

BEST MODE FOR CARRYING OUT THE INVENTION

FIG. 1 shows a propeller blade 10, with a protective sheath 12, and ceramic insert 14, according to the present invention. The protective sheath can be constructed from a material of suitable hardness and flexibility such as nickel, nickel cobalt, Watts nickel, or nickel sulfamate. The properties of the protective sheath are determined by the operating environment of the propeller. The method for constructing the nickel sheath is well known to one skilled in the art. Commonly owned U.S. Pat. No. 4,950,375 teaches a method of forming a nickel sheath through an electroplating process. It is also known to those skilled in the art, to form a protective sheath by machining a solid piece of material or by brazing a plurality of components as taught by commonly owned U.S. Pat. No. 4,010,530.

FIG. 2 shows the protective sheath 12 of the present invention. The protective sheath 12 is normally designed to form an aerodynamic profile for the leading edge of the underlying propeller blade 10. As shown in FIG. 3 the protective sheath 12 has a recessed area 16 formed in the protective sheath material. The recessed area 16 may be formed by any suitable process such as machining the protective sheath 12 or modifying the electroplating process.

The profile for the recessed area 16 is determined by the shape of the ceramic insert 14. As shown in FIG. 4 the recessed area 16 is shaped such that the ceramic insert 14 can be secured in the recessed area 16 to form a continuation of the aerodynamic profile of the leading edge of the underlying propeller blade 10.

The ceramic insert 14 is located at the tip end 11 of the propeller blade 10 which is generally defined as the 10% length furthest from the blade root 22.

The ceramic insert 14 can be secured using conventional means such as an adhesive to aid in strain isolation such as silicon RTV, or an epoxy adhesive such as Hysol 9309 or flexible epoxy adhesive such as 3M 2216. It is to be understood that other means may also be used to secure the ceramic insert 14 to the protective sheath 12 such as a screw or pin.

The ceramic insert may be made of any material of suitable hardness such as SiAlON e.g. NT-451 by Norton, or $Si_3N_4$ e.g. GS44 by Allied Signal or zirconia toughened alumina. The properties of the ceramic material are determined by the operating environment of the propeller. In one application the material must be able to withstand exposure to hard sand and therefore have a hardness greater than high quartz sand having a hardness of 1200 kg/mm$^2$. In the same application the strength of the ceramic material is greater than about 70 ksi as determined by the water hammer pressure due to impacting water drop at the tip velocity determined by $P_{WH}=P_{H2O}* C_o* V_i$ where; $V_i$ is the the relative speed of the water droplet approximately 335 m/s for a propeller tip at sonic speeds $C_o$ is the speed of sound in water, i.e., about 1500 m/s; and $P_{H2O}$ is the the density of the water droplet, approximately 1000 kg/m$^3$. The ceramic insert can be formed using techniques known to those skilled in the art such as slip casting or machining.

In a second embodiment the ceramic insert is attached directly to the underlying blade material 20. In this embodiment, shown in FIG. 5, the protective sheath 12 has an opening 18. As shown in FIG. 6, the opening 18 is shaped such that the ceramic insert 14 can be secured to the underlying blade material to form a continuation of the aerodynamic profile for the leading edge of the underlying propeller blade 10. The ceramic insert 14 can be secured to the blade material using the techniques discussed herein.

As shown in FIGS. 7 and 8, the second embodiment can be further modified to include a plurality of protrusions 15 on a side of the ceramic insert that contacts the underlying blade material. The underlying blade material is modified to receive the protrusions 15 thus providing a stronger bond between the ceramic material and underlying blade material.

It should be understood by those skilled in the art that obvious structural modifications can be made without departing from the spirit or scope of the invention. Accordingly, reference should be made primarily to the accompanying claims, rather than the foregoing specification, to determine the scope of the invention.

Having thus described the invention, what is claimed is:

1. A sheath for protecting a leading edge of a propeller blade, of a propeller system, the propeller blade having a normal bending moment, the sheath comprising:

a) a first protection means comprising a first material, wherein said first protection means is attached to the leading edge of the propeller blade for protecting the leading edge from erosion, wherein said first protection means has an aerodynamic profile, and wherein said first protection means has a recessed area at a tip end of the propeller blade; and, b) a second protection means comprising a ceramic material, wherein said ceramic material is releasably attached by an adhesive material to said first protection means within said recessed area of said first protection means, wherein said second protection means forms a continuation of said aerodynamic profile of said first protection means, wherein said adhesive material isolates said second protection means from the normal bending moment of the propeller blade.

2. The sheath of claim 1 wherein said first protection means comprises a ductile metal which allows for flexing and twisting of the propeller blade during operation.

3. The sheath of claim 2 wherein said first protection means comprises Watts Nickel.

4. The sheath of claim 2 wherein said first protection means comprises nickel sulfamate.

5. The sheath of claim 2 wherein said first protection means comprises nickel cobalt.

6. The sheath of claim 1 wherein said ceramic comprises SiAlON.

7. The sheath of claim 1 wherein said ceramic comprises $Si_3N_4$.

8. The sheath of claim 1 wherein said ceramic comprises zirconia toughened alumina.

9. The sheath of claim 1 wherein said ceramic has a strength greater than about 70 ksi and a hardness greater than about 1200 kg/mm$^2$.

10. A sheath for protecting a propeller blade of a propeller system, the propeller blade having a normal bending moment, the sheath comprising:

a) a first protection means comprising a ductile metal, attached to a leading edge of the propeller blade, for protecting said leading edge from erosion, said first protection means forming an aerodynamic profile for the propeller blade;

b) a second protection means comprising a ceramic material, wherein said ceramic material is releasably attached by an adhesive material to a portion of said first protection means along a tip end of the leading edge of the propeller blade for providing increased erosion protection for said tip end, wherein said adhesive material isolates said second protection means from the normal bending moment of the propeller blade.

11. The sheath of claim 10 wherein said first protection means comprises Watts Nickel.

12. The sheath of claim 10 wherein said first protection means comprises nickel sulfamate.

13. The sheath of claim 10 wherein said first protection means comprises nickel cobalt.

14. The sheath of claim 10 wherein said ceramic second protection means comprises SiAlON.

15. The sheath of claim 10 wherein said ceramic second protection means comprises $Si_3N_4$.

16. The sheath of claim 10 wherein said ceramic second protection means comprises zirconia toughened alumina.

17. The sheath of claim 11 wherein said ceramic second protection means has a strength greater than about 70 ksi and a hardness greater than about 1200 kg/mm$^2$.

18. A sheath for protecting a leading edge of a propeller blade, of a propeller system, the propeller blade having a normal bending moment, the sheath comprising:

a) a first protection means comprising a ductile metal attached to the leading edge of the propeller blade for protecting the leading edge from erosion, wherein said first protection means has an aerodynamic profile, and wherein said first protection means has an opening exposing an underlying blade material at a tip end of the propeller blade; and, b) a second protection means comprising a ceramic material, wherein said second material is releasably attached by an adhesive material to the underlying blade material, wherein said second protection means forms a continuation of said aerodynamic profile of said first protection means and wherein said adhesive material isolates said second protection means from the normal bending moment of the propeller blade.

19. The sheath of claim 18 wherein said first protection means comprises Watts Nickel.

20. The sheath of claim 18 wherein said first protection means comprises nickel sulfamate.

21. The sheath of claim 18 wherein said first protection means comprises nickel cobalt.

22. The sheath of claim 18 wherein said ceramic second protection means comprises SiAlON.

23. The sheath of claim 18 wherein said ceramic second protection means comprises $Si_3N_4$.

24. The sheath of claim 18 wherein said ceramic second protection means comprises zirconia toughened alumina.

25. The sheath of claim 18 wherein said ceramic second protection means has a strength greater than about 70 ksi and a hardness greater than about 1200 $kg/mm^2$.

26. The sheath of claim 18 wherein said ceramic second protection means further comprises:

a plurality of protrusions located on a lower side of said ceramic second protection means and wherein said underlying blade material is adapted to receive said plurality of protrusions when said lower side is in contact with said underlying blade material.

* * * * *